United States Patent
Liao et al.

(10) Patent No.: US 10,886,958 B2
(45) Date of Patent: Jan. 5, 2021

(54) OVER-THE-AIR SIGNAL ASSISTED INTERFERENCE CANCELLATION OR SUPPRESSION

(71) Applicant: MEDIATEK INC., Hsin-Chu (TW)

(72) Inventors: Pei-Kai Liao, Hsin-Chu (TW); Chun-Ming Kuo, Hsin-Chu (TW); Chien-Hwa Hwang, Hsin-Chu (TW); Jiann-Ching Guey, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/820,925

(22) Filed: Mar. 17, 2020

(65) Prior Publication Data
US 2020/0304159 A1 Sep. 24, 2020

Related U.S. Application Data

(60) Provisional application No. 62/819,703, filed on Mar. 18, 2019.

(51) Int. Cl.
*H04B 1/12* (2006.01)
*H04W 72/04* (2009.01)

(52) U.S. Cl.
CPC ............ *H04B 1/12* (2013.01); *H04W 72/042* (2013.01)

(58) Field of Classification Search
CPC .......... H04B 1/10; H04B 1/1027; H04B 1/12; H04W 72/042
See application file for complete search history.

(56) References Cited

U.S. PATENT DOCUMENTS

2016/0013903 A1* 1/2016 Kim ...................... H04L 5/0048
370/329
2016/0020875 A1 1/2016 Seo et al. .................... 370/280
(Continued)

FOREIGN PATENT DOCUMENTS

CN     106162907 A     4/2015
CN     107046713 A     2/2016
(Continued)

OTHER PUBLICATIONS

International Search Report and Written Opinion of International Search Authority for PCT/CN2020/079931 dated May 27, 2020 (9 pages).

(Continued)

*Primary Examiner* — Nguyen T Vo
(74) *Attorney, Agent, or Firm* — Imperium Patent Works; Zheng Jin

(57) ABSTRACT

A method of providing over-the-air assistance information for interference cancellation or suppression to the receiver is proposed. Under a first solution, a two-stage DCI (downlink control information) or SCI (sidelink control information) scheduling method is proposed. The set of first-stage DCI or SCI provides a part of scheduling information which is beneficial for interference cancellation or suppression and is broadcasted by a transmitter or scheduler to all receivers. The set of second-stage DCI or SCI includes the remaining scheduling information and is unicasted by a transmitter or scheduler to each receiver. Under a second solution, assistance information DCI for interference cancellation or suppression is broadcasted by a transmitter or scheduler to all receivers.

20 Claims, 6 Drawing Sheets

(56) References Cited

U.S. PATENT DOCUMENTS

2016/0174194 A1    6/2016  Suzuki et al. ................ 370/312
2017/0078126 A1*  3/2017  Einhaus .............. H04W 72/042
2018/0167959 A1*  6/2018  Liao .................. H04W 72/1273

FOREIGN PATENT DOCUMENTS

| EP | 3031242 A1 | 8/2013 |
|---|---|---|
| WO | WO2015017983 A1 | 8/2013 |

OTHER PUBLICATIONS

R1-1717064 3GPP TSG RAN WG1 Meeting #90bis, Huawei et al., DCI contents and formats in NR, Prague, Czech Republic, Oct. 9-13, 2017 (10 pages) sections 2-3.

R1-1719422 3GPP TSG RAN WG1 Meeting #91, Huawei et al., Beam measurement, reporting and indication, Reno, USA, Nov. 27-Dec. 1, 2017 (12 pages).

\* cited by examiner

OVER-THE-AIR SIGNAL ASSISTED INTERFERENCE CANCELLATION OR SUPPRESSION

CROSS REFERENCE TO RELATED APPLICATIONS

This application claims priority under 35 U.S.C. § 119 from U.S. Provisional Application No. 62/819,703, entitled "Over-the-air Signal Assisted Interference Cancellation and Suppression," filed on Mar. 18, 2019, the subject matter of which is incorporated herein by reference.

TECHNICAL FIELD

The present invention relates generally to wireless communication systems and, more particularly, to signal-assisted interference cancellation and suppression.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for downlink (DL) scheduling or uplink (UL) scheduling of Physical Downlink Shared Channel (PDSCH) or Physical Uplink Shared Channel (PUSCH) transmission. The DL/UL scheduling information carried by PDCCH is referred to as downlink control information (DCI).

Inter/intra-cell interference is always an important issue for a wireless mobile broadband cellular system. It impacts the spectrum efficiency as well as user experience (e.g. user throughput). Many solutions have been proposed to resolve it. Some solutions are from transmitter side perspective, e.g. 3GPP LTE Release 11 CoMP, 3GPP LTE Release 13 FD-MIMO. Some solutions are from receiver side perspective, e.g. 3GPP LTE Release 12 NAICS, 3GPP LTE Release 14 MUST. To combat the interference issue, both transmitter side-based and receiver side-based solutions should be considered.

The biggest issue for solutions from receiver side perspective is how to efficiently provide assistance information from the transmitter (or scheduler) side to the receiver side for interference cancellation or suppression. For wireless mobile broadband cellular systems, intra-cell interference cancellation or suppression is beneficial for MU-MIMO, DL superposition transmission (e.g., DL NOMA), and the multiplexing of eMBB UE & URLLC UE; inter-cell interference cancellation or suppression is beneficial for the same transmission direction (e.g., DL or UL for both serving and interfering signals) and for different transmission directions (e.g., DL for serving signal and UL for interfering signal or vice versa). For vehicle-to-everything (V2X) or device-to-device wireless communication system, inter-device interference cancellation or suppression is beneficial to improve communication range or user throughput over the link.

In 3GPP LTE Release 12 NAICS (network assisted interference cancellation & suppression) feature, eNB provides assistance information to UEs by RRC signal carried in physical downlink shared channel (PDSCH). In 3GPP LTE Release 14 DL MUST (downlink multi-user superposition transmission) feature, eNB provides assistance information to UEs by unicast downlink control information (DCI) carried in physical downlink control channel (PDCCH). Improvements are sought to provide assistance information for the interference cancellation or reception at the receiver side.

SUMMARY

A method of providing over-the-air assistance information for interference cancellation or suppression to the receiver is proposed. Under a first solution, a two-stage DCI (downlink control information) or SCI (sidelink control information) scheduling method is proposed. The first-stage DCI or SCI provides a part of scheduling information which is beneficial for interference cancellation or suppression and is broadcasted by a transmitter or scheduler to all receivers. The second-stage DCI or SCI includes the remaining scheduling information and is unicasted by a transmitter or scheduler to each receiver. Under a second solution, assistance information DCI for interference cancellation or suppression is broadcasted by a transmitter or scheduler to all receivers.

In one embodiment, a UE receives and detects one or more first-stage downlink control information (DCIs) for one or more UEs transmitted from one or more base stations in a wireless mobile broadband cellular network. The UE receives and detects a second-stage DCI to obtain scheduling information to receive a scheduled physical downlink shared channel (PDSCH) for data based on a higher-layer configured UE ID and the information obtained in the corresponding first-stage DCI. The scheduling information is carried in one of the detected first-stage DCIs and the detected second-stage DCI. The UE performs interference cancellation or suppression for the scheduled PDSCH based on the detected one or more first-stage DCIs.

In another embodiment, a UE receives and detects one or more first-stage sidelink control information (SCIs) for one or more receiving UEs transmitted from one or more transmitting UEs in a vehicle-to-everything or device-to-device wireless communication network. The UE receives and detects a second-stage SCI to obtain scheduling information to receive a scheduled physical sidelink shared channel (PSSCH) for data based on a higher-layer configured UE ID and the information obtained in the corresponding first-stage SCI. The scheduling information is carried in one of the detected first-stage SCIs and the detected second-stage SCI. The UE performs interference cancellation or suppression for the scheduled PSSCH based on the detected one or more first-stage SCIs.

In yet another embodiment, a UE receives one or more broadcast downlink control information (DCIs) for one or more UEs from one or more base stations in a wireless mobile broadband cellular network. The UE detects the one or more broadcast DCIs. The one or more broadcast DCIs carries assistance information that comprises a part of scheduling information of the one or more UEs. The UE receives and detects a unicast DCI to obtain scheduling information of the UE to receive a scheduled physical downlink shared channel (PDSCH) for data. The UE performs interference cancellation or suppression for the scheduled PDSCH based on the assistance information carried by the one or more broadcast DCIs.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
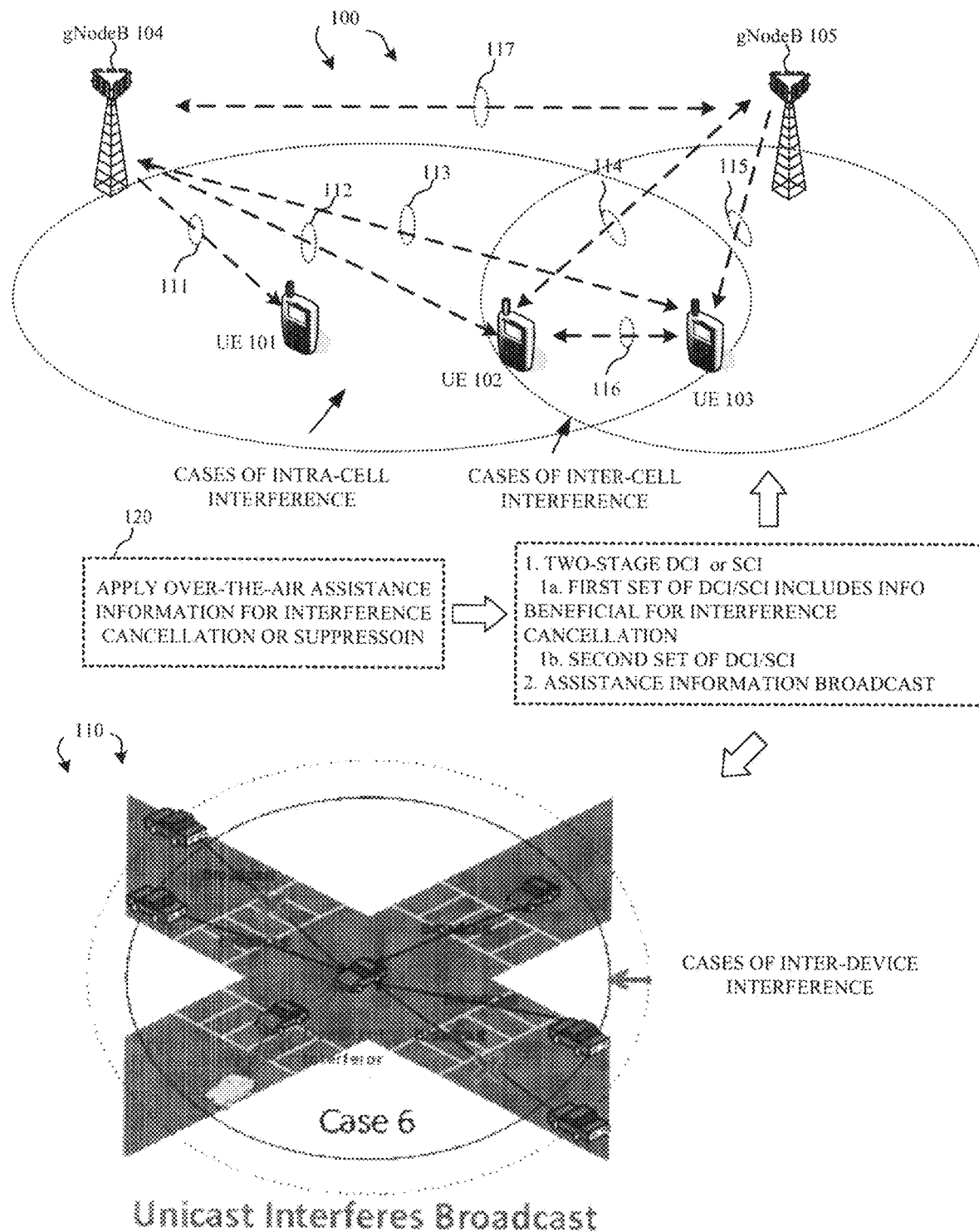
FIG. 1 illustrates a method of providing over-the-air assistance information for interference cancellation or suppression in wireless mobile broadband cellular systems and in vehicle-to-everything or device-to-device wireless communication systems in accordance with one novel aspect.

FIG. 1 illustrates a method of providing over-the-air assistance information for interference cancellation or suppression in a wireless mobile broadband cellular system 100 and in a vehicle-to-everything (V2X) or device-to-device wireless communication systems 110 in accordance with one novel aspect. The wireless mobile broadband cellular network 100 comprises serving base stations gNB 104, gNB 105, and a plurality of user equipments including UE 101, UE 102, and UE 103. In LTE and new radio (NR) networks, Physical Downlink Control Channel (PDCCH) is used for downlink (DL) scheduling or uplink (UL) scheduling of Physical Downlink Shared Channel (PDSCH) or Physical Uplink Shared Channel (PUSCH) transmission. The DL/UL scheduling information carried by PDCCH is referred to as downlink control information (DCI). The DCI format is a predefined format in which the downlink control information is formed and transmitted in PDCCH. The DCI format gives the UE details such as number of resource blocks, resource allocation type, modulation scheme, transport block, redundancy version, coding rate etc.

Inter/intra-cell interference is always an important issue for a wireless mobile broadband cellular system. It impacts the spectrum efficiency as well as user experience (e.g. user throughput). For wireless mobile broadband cellular system 100, there are different cases of intra-cell and inter-cell interferences. For case 1, UE 101 and UE 102 may be configured with MU-MIMO by their serving gNB 104. DL signal 111 and DL signal 112 may be the intra-cell interfering signal under MU-MIMO. It is beneficial to perform intra-cell interference cancellation or suppression to improve average user throughput and spectrum efficiency when transmitter side multiple antenna precoding or beamforming cannot sufficiently suppress interference between scheduled users with overlapping time or frequency radio resources. For case 2, UE 102 and UE 102 may be configured with NOMA by their serving gNB 104. DL signal 111 may be the intra-cell interfering signal under DL NOMA. It is beneficial to perform intra-cell interference cancellation or suppression to improve spectrum efficiency. For case 3, UE 101 and UE 102 may be eMBB UE and URLLC UE and their traffic are multiplexed together, and the URLLC UE has higher priority and needs to perform interference cancellation or suppression. For case 4, UE 102 and UE 103 are served by gNB 104 and gNB 105 in different serving cells. Inter-cell interference may occur for the same transmission direction e.g., DL/UL 113 and DL/UL 114. Interference cancellation or suppression is beneficial to improve cell-edge user experience and spectrum efficiency. For case 5, UE 102 and UE 103 are served by gNB 104 and gNB 105 in different serving cells. Inter-cell interference may occur for the different transmission direction e.g., DL for serving signal DL 115 and UL 116 for interfering signal or vice versa, signal 117 between gNBs may also become an interference signal. Interference cancellation or suppression is beneficial to improve cell-edge user experience and spectrum efficiency.

Similarly, vehicle-to-everything or device-to-device wireless communication systems also have the problem of inter-device interference. In V2X systems, Physical Sidelink Control Channel (PSCCH) is used for sidelink (SL) scheduling of Physical Sidelink Shared Channel (PSSCH) transmission. The sidelink scheduling information carried by PSCCH is referred to as sidelink control information (SCI). SCI is transmitted over sidelink from TX UE to RX UE. The SCI format is a predefined format in which the sidelink control information is formed and transmitted in PSCCH. The SCI format gives the UE details such as number of resource blocks, resource allocation type, modulation scheme, transport block, redundancy version, coding rate etc. In the example of FIG. 1, V2X 110 comprises a plurality of UEs, and the UE types include at least vehicle-mounted UEs, road-side unit UEs, cell phone UEs. For in-coverage UEs, a base station can schedule the data traffic over sidelink via Uu link. For out-of-coverage UEs, UE can schedule the data traffic over sidelink based on its autonomous resource selection. In a V2X system, a transmitter cannot obtain all UE's scheduling information so there is hidden node issue. Receiver-side interference cancellation based on the received assistance information is beneficial to improve the system capacity and the reliability of the received signal.

In accordance with one novel aspect, there are two candidate solutions to provide over-the-air assistance information for interference cancellation or suppression to the receiver (120). Under a first solution, a two-stage DCI (downlink control information) or SCI (sidelink control information) scheduling method is proposed. The first-stage DCI or SCI provides a part of scheduling information which is beneficial for interference cancellation or suppression and is broadcasted by a transmitter or scheduler to all receivers. The second-stage DCI or SCI includes the remaining scheduling information and is unicasted by a transmitter or scheduler to each receiver. Under a second solution, assistance information DCI for interference cancellation or suppression is broadcasted by a transmitter or scheduler to all receivers.

Figure 2:
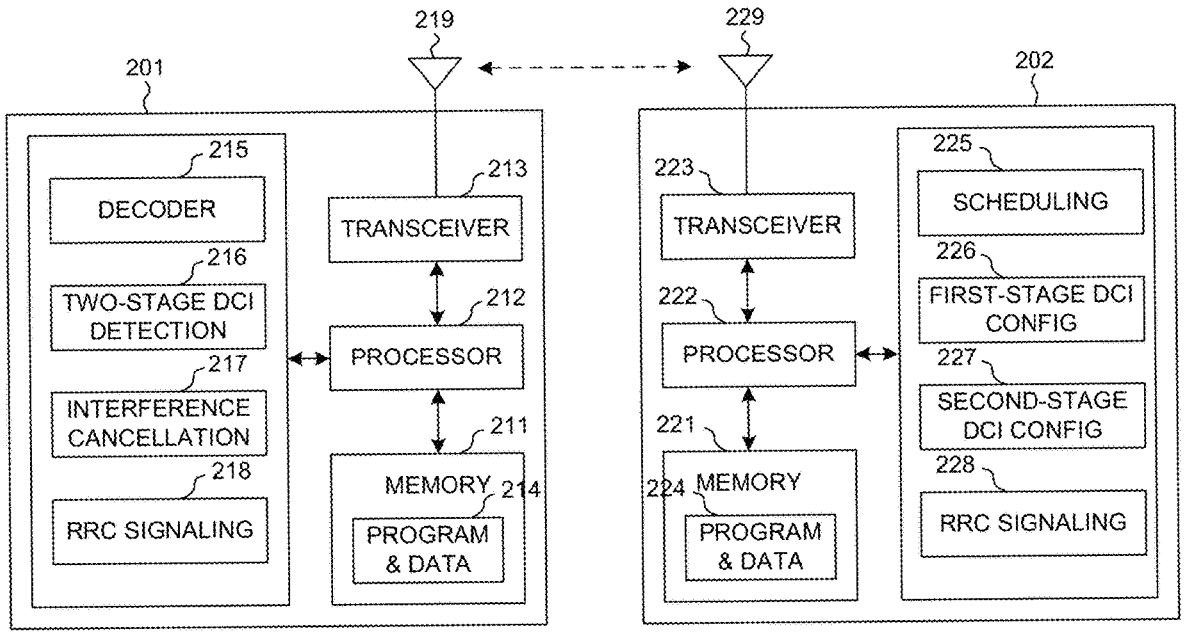
FIG. 2 is a simplified block diagram of a user equipment and a base station that carry embodiments of the present invention.

FIG. 2 is a simplified block diagram of a user equipment UE 201 and a base station eNB 202 that carry embodiments of the present invention. UE 201 comprises memory 211, a processor 212, an RF transceiver 213, and an antenna 219. RF transceiver 213, coupled with antenna 219, receives RF signals from antenna 219, converts them to baseband signals and sends them to processor 212. RF transceiver 213 also converts received baseband signals from processor 212, converts them to RF signals, and sends out to antenna 219. Processor 212 processes the received baseband signals and invokes different functional modules and circuits to perform features in UE 201. Memory 211 stores program instructions and data 214 to control the operations of UE 201. The program instructions and data 214, when executed by processor 212, enables UE 201 to receive higher layer and physical layer configuration for 2-stage DCI scheduling.

Similarly, eNB 202 comprises memory 321, a processor 222, an RF transceiver 223, and an antenna 229. RF transceiver 223, coupled with antenna 229, receives RF signals from antenna 229, converts them to baseband signals and sends them to processor 222. RF transceiver 223 also converts received baseband signals from processor 222, converts them to RF signals, and sends out to antenna 229. Processor 222 processes the received baseband signals and invokes different functional modules and circuits to perform features in eNB 202. Memory 221 stores program instructions and data 224 to control the operations of eNB 202. The program instructions and data 224, when executed by processor 222, enables eNB 202 to configure via higher layer and physical layer signaling of first-stage DCI and second-stage DCI scheduling, as well as assistance information via DCI broadcasting. Note that in V2X system, a source UE may also become a scheduler that provides the two-stage SCI scheduling for other UEs.

UE 201 and eNB 202 also comprise various function modules and circuits that can be implemented and configured in a combination of hardware circuits and firmware/software codes being executable by processors 212 and 222 to perform the desired functions. Each functional module or circuit may comprise a processor together with corresponding program codes. In one example, UE 201 comprises a decoder 215 that decodes the content of the detected two-stage DCI and assistance information via DCI/SCI broadcasting, a two-stage DCI/SCI detection circuit 216 that monitors and detects first-stage and second-stage DCI, an interference cancellation and suppression module 217 that performs interference cancellation and/or suppression, and an RRC configuration circuit 218 for receiving higher layer DCI parameters. Similarly, eNB 202 comprises a scheduling module 225 that provides downlink scheduling and uplink grant, a first-stage DCI configurator 226 that provides basic scheduling information for interference cancellation or suppression, a second-stage DCI configurator 227 that provides remaining scheduling information, and an RRC configuration circuit 228 for providing higher layer DCI parameters.

Figure 3:
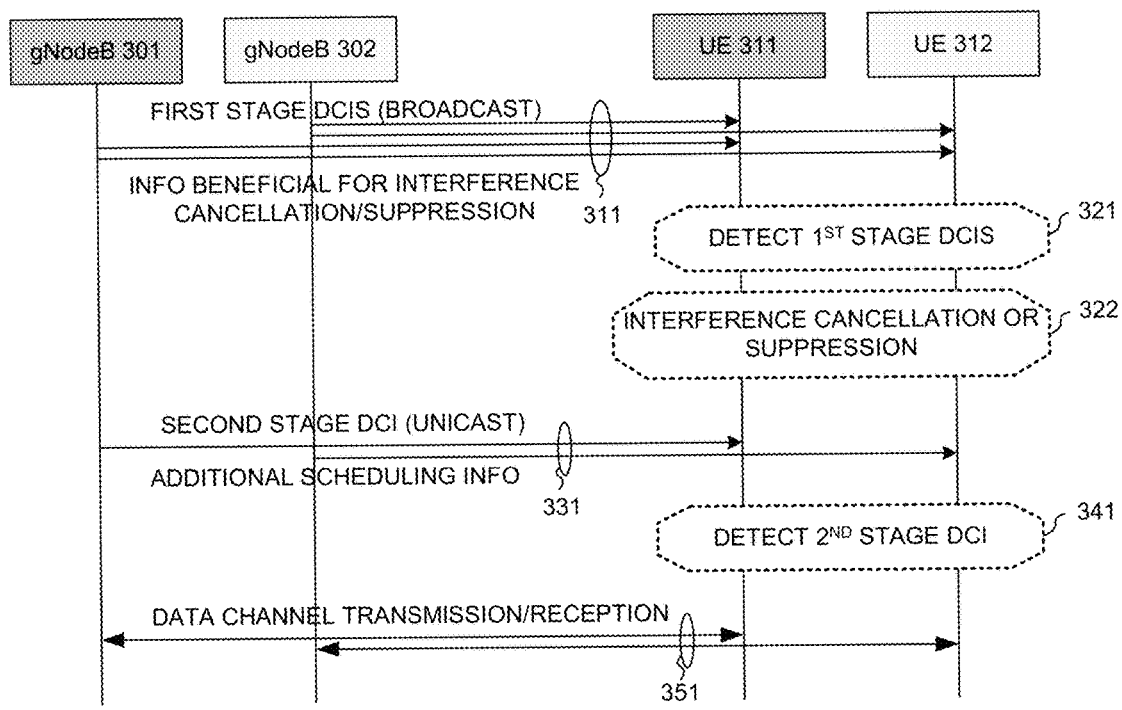
FIG. 3 illustrates a signal flow between a base station and a user equipment of two stage downlink control information (DCI) for interference cancellation or suppression in wireless mobile broadband cellular systems in accordance with one novel aspect.

FIG. 3 illustrates a signal flow between a base station and a user equipment of two stage downlink control information (DCI) for interference cancellation or suppression in wireless mobile broadband cellular systems in accordance with one novel aspect. The biggest issue for solutions from receiver side perspective is how to efficiently provide assistance information from the transmitter (or scheduler) side to the receiver side for interference cancellation or suppression. In wireless mobile broadband cellular systems, there are base stations (gNBs) and user equipments (UEs). A gNB schedules both downlink (DL) and uplink (UL) data by DCI carried in PDCCH for UEs served by the gNB based on the arrivals of DL traffic at the gNB and the UEs' requests for the arrivals of UL traffic at the UEs, respectively. A two-stage DCI solution divides the full set of scheduling information for each UE into two sets.

In step 311, gNB 301 and gNB 302 broadcasts a set of first-stage DCIs to a plurality of UEs including UE 311 and UE 312. The set of first-stage DCIs includes a part of scheduling information which is beneficial for interference cancellation or suppression and is broadcasted by gNB 301 and gNB 302 to all UEs served by gNB 301 and gNB 302 and neighboring base stations. The part of the scheduling information of being scheduled data over PDSCH and PUSCH includes at least the following 1) frequency domain resource allocation (e.g. RBs in LTE or NR) of PDSCH/PUSCH; 2) Time domain resource allocation (e.g. OFDM symbols in LTE or NR) of PDSCH/PUSCH; 3) Modulation order (e.g. pi/2 BPSK, QPSK, 16QAM, 64QAM, 256QAM) of PDSCH/PUSCH; 4) Antenna port (e.g. DMRS configuration) of PDSCH/PUSCH—either exact antenna ports applied in the indicated time/frequency radio resources or candidate antenna ports applied in the indicated time/frequency radio resources; 5) RB (resource block) bundling size of PDSCH/PUSCH—The number of RBs over which a UE can assume that the same MIMO precoder or beamforming is applied; 6) Number of spatial layers over the same radio resources of PDSCH/PUSCH—If exact antenna port configurations are provided in the set of first-stage DCI, the number of spatial layers over the same radio resources is not necessary, and if only candidate antenna port configurations are provided in the set of first-stage DCI, the number of spatial layers over the same radio resources is beneficial for a UE to detect exact antenna ports; 7) Scheduling information regarding to a set of second-stage DCI, includes at least one of the following including time/frequency location, radio resource size, and modulation order.

In step 321, UE 311 and UE 312 receives and detects all the first-stage DCIs broadcasted by gNB 301 and gNB 302 (and other base stations) in common search space or in group-common search space. In step 322, UE 311 and UE 312 determine the interference signals with significant transmission power in the received signals based on the detected set of first-stage DCIs. UE 311 and UE 312 also cancel or suppress the interference signals with significant transmission power from the received signals based on the detected set of first-stage DCIs. Note that first-stage DCI includes the scheduling information required by other UEs to performance interference cancellation. Therefore, first-stage DCI for the scheduled UE is broadcasted to all UEs so that the other UEs to perform interference cancellation. For example, the scheduling information for each UE is split into a first-stage DCI and a second-stage DCI. The first-stage DCI of UE 311 is broadcast to UE 312 by gNB 301 to help UE 312 to perform interference cancellation or suppression. Similarly, the first-stage DCI of UE 312 is broadcast to UE 311 by gNB 302 to help UE 311 to perform interference cancellation or suppression.

In step 331, serving gNB 301 unicasts a second-stage DCI to UE 311, or groupcasts the second-stage DCI to group-specific UEs including UE 311. Similarly, serving gNB 302 unicasts a second-stage DCI to UE 312, or groupcasts the second-stage DCI to group-specific UEs including UE 312. The second-stage DCI includes the remaining scheduling information for UE 311 and UE 312, e.g., which includes scrambling information, such that UE 311 and UE 312 are able to decode the received codewords from their serving base station gNB 301 and gNB 302, respectively. In step 341, UE 311 and UE 312 receive and detect the second-stage DCI in UE-specific or group-specific search space. Finally, in step 351, gNB 301 and UE 311 are able to perform data channel transmission and reception based on both the first-stage and the second-stage DCI scheduling information. Similarly, gNB 302 and UE 312 are able to perform data channel transmission and reception based on both the first-stage and the second-stage DCI scheduling information. Note that for two-stage DCI case, both stages of DCI are intended for the scheduled UE. For second-stage DCI, it is unicasted to the scheduled UE and other UEs cannot receive it.

Figure 4:
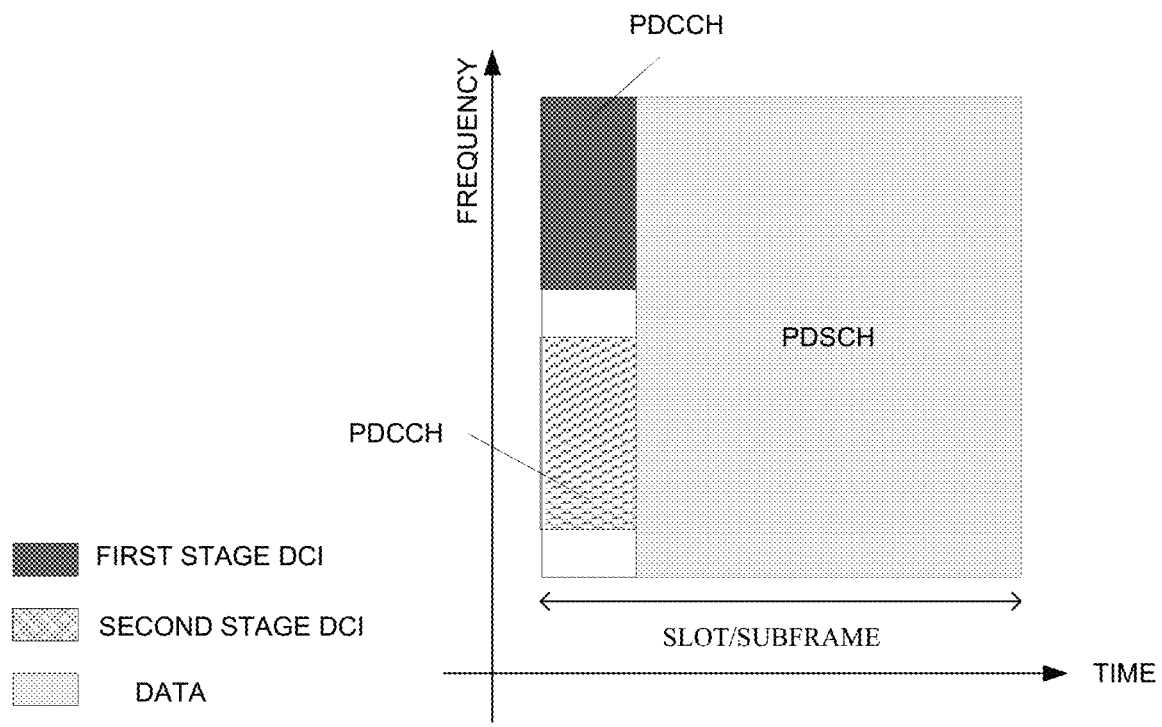
FIG. 4 illustrates a first embodiment of two-stage DCI where the first and second-stages of DCI are carried in control region.

FIG. 4 illustrates a first embodiment of two-stage DCI where the first and second-stages of DCI are carried in control region. The first-stage of DCI is carried in a PDCCH broadcasted in a common search space or a group-common search space. A common search space is pre-defined in the 3GPP specification. A group-common search space is configured by the network to a group of UEs via RRC signaling. The second-stage of DCI is carried in a PDCCH transmitted in a UE-specific search space or in a group-specific search space. The UE-specific search space is configured for each UE specifically. The group-specific search space is configured by the network to a specific group of UEs via RRC signaling. In the example of FIG. 4, both the first-stage DCI and the second-stage DCI are carried in PDCCH control region.

Figure 5:
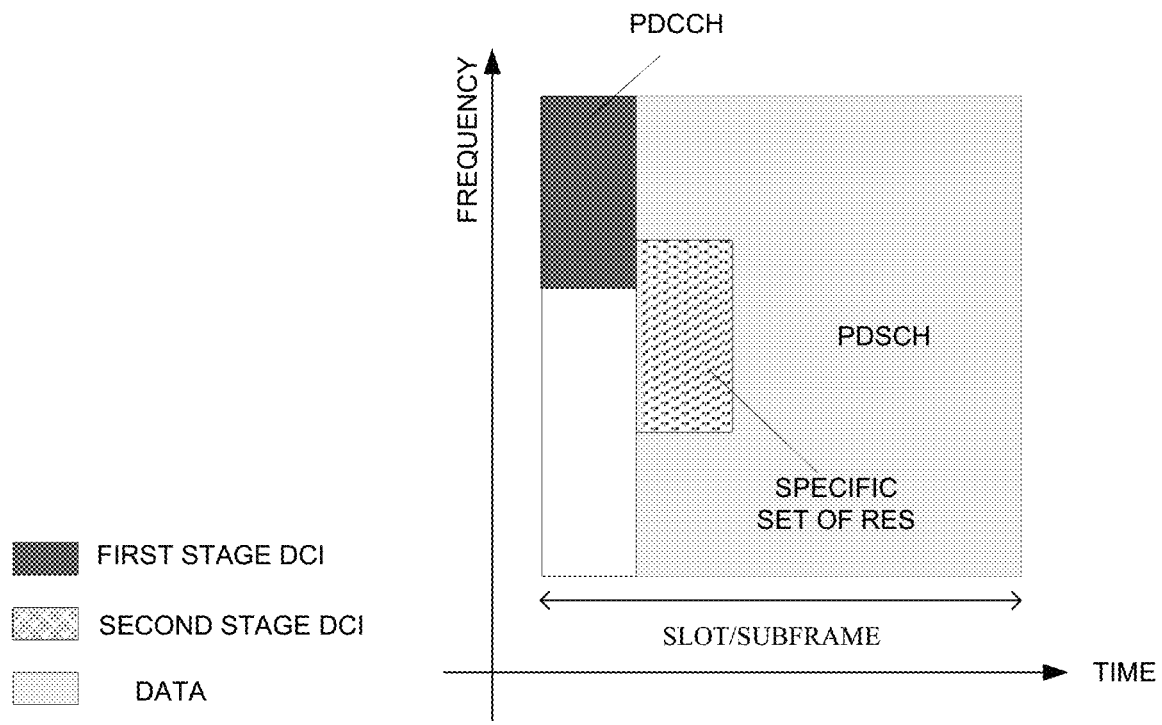
FIG. 5 illustrates a second embodiment of two-stage DCI where the first-stage of DCI is carried in control region and the second-stage of DCI is carried in data region.

FIG. 5 illustrates a second embodiment of two-stage DCI where the first-stage of DCI is carried in control region and the second-stage of DCI is carried in data region. The first-stage of DCI is carried in a PDCCH broadcasted in a common search space or a group-common search space. A common search space is pre-defined in the 3GPP specification. A group-common search space is configured by the network to a group of UEs via RRC signaling. The second-stage of DCI is carried in a PDSCH transmitted in a UE-specific search space or in a group-specific search space. The UE-specific search space is configured for each UE specifically. The group-specific search space is a specific set of radio resources that is predefined. The specific set of radio resources is configured by the network via RRC signaling and then selected via the first-stage DCI. In the example of FIG. 5, the first-stage DCI is carried in PDCCH control region, while the second-stage DCI is carried in a specific set of REs in PDSCH data region.

Figure 6:
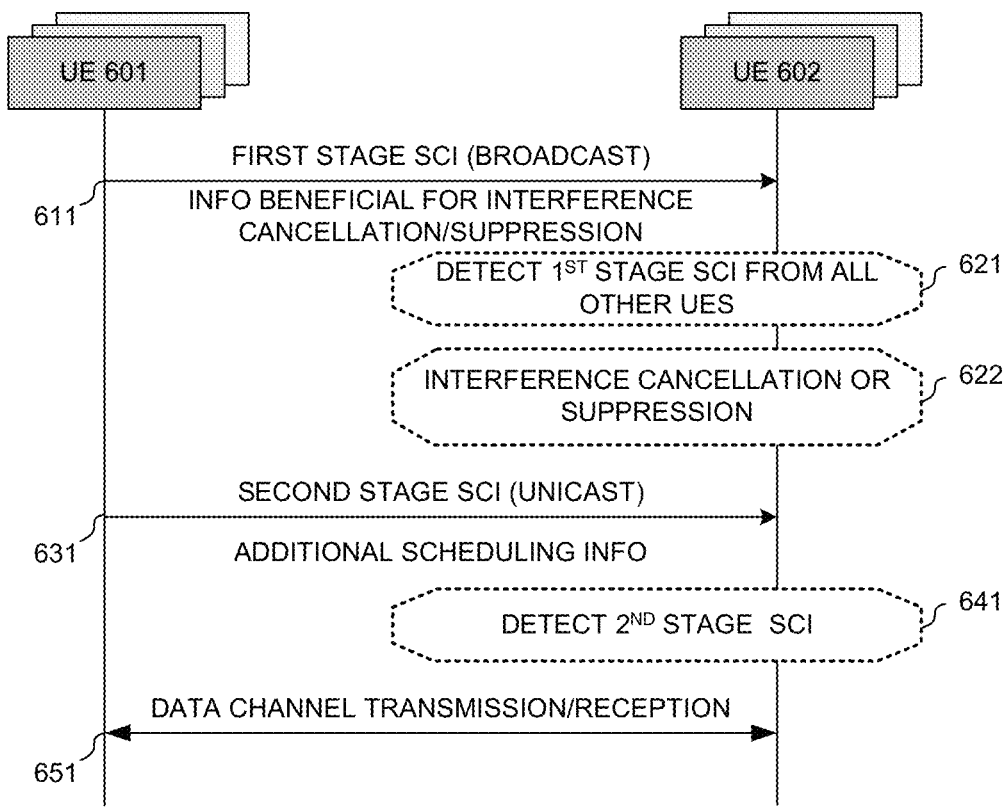
FIG. 6 illustrates a signal flow between a user equipment and another user equipment of two stage sidelink control information (SCI) for interference cancellation or suppression in vehicle-to-everything or device-to-device wireless communication systems in accordance with one novel aspect.

FIG. 6 illustrates a signal flow between a user equipment and another user equipment of two stage sidelink control information (SCI) for interference cancellation or suppression in vehicle-to-everything or device-to-device wireless communication systems in accordance with one novel aspect. In a vehicle-to-everything (V2X) or device to device wireless communication system, there are multiple UEs only and the UE types include at least vehicle-mounted UEs, road-side unit UEs, cell phone UEs. For in-coverage UEs, a base station can schedule the data traffic over sidelink via Uu link. For out-of-coverage UEs, UE can schedule the data traffic over sidelink based on its autonomous resource selection. SCI (sidelink control information) is transmitted over sidelink so SCI is transmitted together with PSSCH (physical sidelink shared channel) from Tx UE to a Rx UE. In this V2X system, a transmitter can't obtain all UE's scheduling information so there is hidden node issue. Receiver-side interference cancellation based on the received assistance information is beneficial to improve the system capacity and the reliability of the received signal. A two-stage SCI solution divides the full set of scheduling information for each UE into two sets.

In step 611, a plurality of UEs including UE 601 broadcasts a set of first-stage SCIs to a plurality of other UEs including UE 602. The set of first-stage SCIs includes a part of scheduling information which is beneficial for interference cancellation or suppression and is broadcasted by UE 601 to all UEs. The part of the scheduling information includes at least the following 1) frequency domain resource allocation (e.g. RBs in LTE or NR) of PSSCH; 2) Time domain resource allocation (e.g. OFDM symbols in LTE or NR) of PSSCH; 3) Modulation order (e.g. pi/2 BPSK, QPSK, 16QAM, 64QAM, 256QAM) of PSSCH; 4) Antenna port (e.g. DMRS configuration) of PSSCH—either exact antenna ports applied in the indicated time/frequency radio resources or candidate antenna ports applied in the indicated time/frequency radio resources; 5) RB (resource block) bundling size of PSSCH—The number of RBs over which a UE can assume that the same MIMO precoder or beamforming is applied; 6) Number of spatial layers over the same radio resources of PSSCH—If exact antenna port configurations are provided in the set of first-stage SCIs, the number of spatial layers over the same radio resources is not necessary, and if only candidate antenna port configurations are provided in the set of first-stage SCIs, the number of spatial layers over the same radio resources is beneficial for a UE to detect exact antenna ports; 7) Scheduling information regarding to a set of second-stage SCIs, includes at least one of the following including time/frequency location, radio resource size, and modulation order.

In step 621, UE 602 receives and detects the set of first-stage SCIs broadcasted by all other UEs in a predefined or a pre-configured search space. In step 622, UE 602 determines the interference signals with significant transmission power in the received signals based on the detected set of first-stage SCIs. UE 602 also cancels or suppresses the interference signals with significant transmission power from the received signals based on the detected set of first-stage SCIs. Note that first-stage SCI includes the scheduling information of a scheduled UE required by other UEs to performance interference cancellation or suppression. Therefore, the first-stage SCI for the scheduled UE is broadcasted to all UEs by a source UE so that the other UEs can perform interference cancellation or suppression.

In step 631, UE 601 unicasts a second-stage SCI to UE 602, or groupcasts the second-stage SCI to group-specific UEs including UE 602. The second-stage SCI includes the remaining scheduling information for UE 602, e.g., which includes scrambling information, such that UE 602 is able to decode the received codewords. In step 641, UE 602 receives and detects the second-stage SCI in UE-specific or group-specific search space. Finally, in step 651, UE 601 and UE 602 are able to perform data channel transmission and reception based on both the first-stage and the second-stage SCIs.

Similar to two-stage DCI as depicted in FIG. 4 and FIG. 5, the first and second-stages of SCIs can be carried in control region and/or data region. In one embodiment similar to FIG. 4, both the first-stage SCI and the second-stage SCI are carried in PSCCH control region. In one example, the first-stage SCI is carried in a PSCCH broadcasted in a pre-defined or pre-configured resource location, e.g., a common search space or a group-common search space. The second-stage SCI is carried in a PSCCH transmitted in a UE-specific or a pre-configured group-specific search space. For example, pre-configuration is done by recording the setting into SIM card or memory of a UE. After the recording, it can no longer be changed.

In one embodiment similar to FIG. 5, the first-stage SCI is carried in PSCCH control region, while the second-stage SCI is carried in a specific set of radio resources within data region. In one example, the first-stage SCI is carried in a PSCCH broadcasted in a pre-defined or pre-configured resource location, e.g., a common search space or a group-common search space. The second-stage SCI is carried in a specific set of radio resources within data region. The specific set of radio resources can be predefined or preconfigured. Multiple sets of radio resources are pre-configured and then selected via the first-stage SCI.

For demodulation reference signal (DMRS)'s scrambling sequence collision avoidance for PSCCH carrying first-stage SCI between UEs, the following methods can be applied: 1) DMRS's scrambling sequence seed is preconfigured—it can be reconfigured by the network when a UE is in-coverage; 2) DMRS's scrambling sequence seed is based on random selection by a UE; 3) DMRS's scrambling sequence seed is based on UE identification (ID), e.g. source UE ID, destination UE ID or both; 4) DMRS's scrambling sequence seed is based on a UE's position. For demodulation reference signal (DMRS)'s antenna port collision avoidance for PSCCH carrying first-stage SCI between UEs, the following methods can be applied: 1) DMRS's antenna port is preconfigured—It can be reconfigured by the network when the source UE is in-coverage; 2) DMRS's antenna port is based on random selection by the source UE; 3) DMRS's antenna port is based on UE identification (ID), e.g. source UE ID, destination UE ID or both; 4) DMRS's antenna port is based on the source UE's position.

For demodulation reference signal (DMRS)'s scrambling sequence collision avoidance for the scheduled physical sidelink shared channel (PSSCH) between UEs, the following methods can be applied: 1) DMRS's scrambling sequence seed is preconfigured—It can be reconfigured by the network when the source UE is in-coverage; 2) DMRS's scrambling sequence seed is based on random selection by the source UE; 3) DMRS's scrambling sequence seed is based on UE identification (ID), e.g. source UE ID, destination UE ID or both; 4) DMRS's scrambling sequence seed is based on the source UE's position. For demodulation reference signal (DMRS)'s antenna port collision avoidance for the scheduled physical sidelink shared channel (PSSCH) between UEs, the following methods can be applied: 1) DMRS's antenna port is preconfigured—It can be reconfigured by the network when the source UE is in-coverage; 2) DMRS's antenna port is based on random selection by the source UE; 3) DMRS's antenna port is based on UE identification (ID), e.g. source UE ID, destination UE ID or both; 4) DMRS's antenna port is based on the source UE's position.

Figure 7:
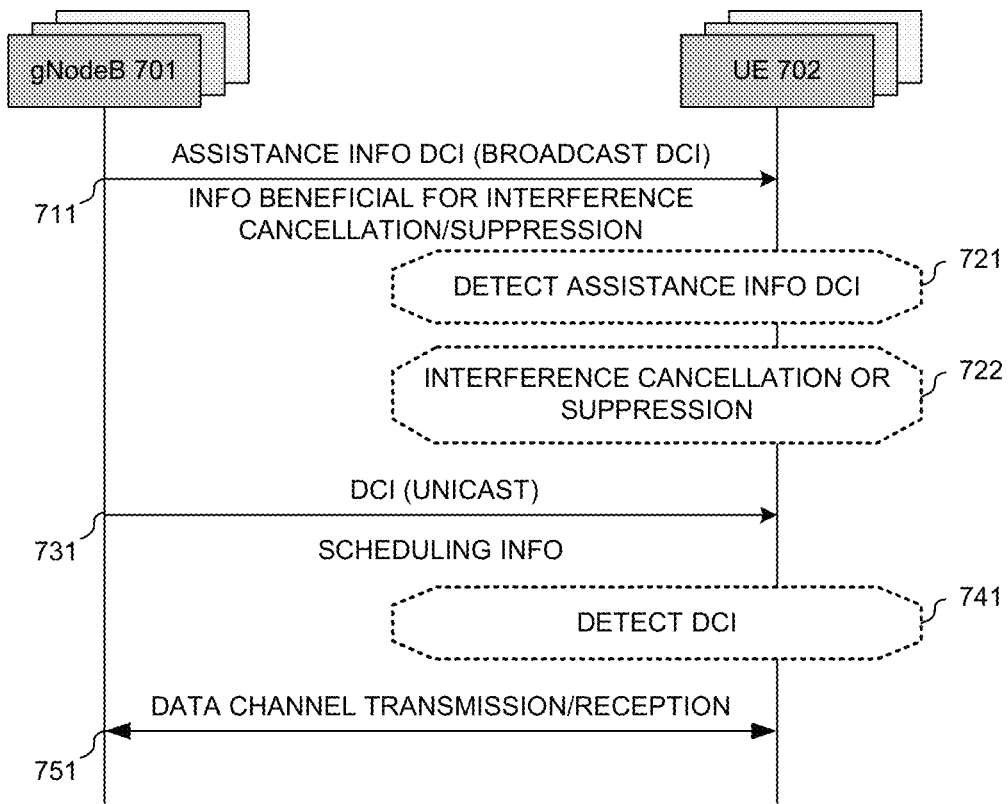
FIG. 7 illustrates a signal flow between a base station and a user equipment of assistance information broadcast for interference cancellation or suppression in wireless mobile broadband cellular systems in accordance with one novel aspect.

FIG. 7 illustrates a signal flow between a base station gNB 701 and a user equipment UE 702 of assistance information broadcasting for interference cancellation or suppression in wireless mobile broadband cellular systems in accordance with one novel aspect. In a wireless mobile broadband cellular system, there are base stations and user equipments (UEs). A base station schedules both downlink (DL) and uplink (UL) data by DCI carried in PDCCH for UEs served by the base station based on the arrivals of DL traffic at the base station and UEs' requests for the arrivals of UL traffic at UEs, respectively. For less impact on scheduling DCI, a new broadcast DCI including the assistance information for interference cancellation or suppression is proposed to be transmitted by a base station to all UEs served by both the base station and neighboring base stations. Note that under this method, gNB extracts part of the scheduling information for certain scheduled UEs and puts it into a broadcast DCI (e.g., the assistance information) to all UEs, and UEs can use this information for interference cancellation or suppression whenever they receive the broadcast DCI.

In step 711, a serving base station gNB 701 broadcasts assistance information to a plurality of UEs including UE 702. The assistance information is carried in a PDCCH transmitted in a group-common search space or common search space, a PDSCH or a specific set of radio resources in data region. If carried in a PDCCH, the group-common search space is configured by the network via an RRC signal. If carried in a PDSCH, the PDSCH is scheduled by a DCI. If carried in a specific set of radio resources in data region, the specific set of radio resources is predefined or configured by the network. In step 721, UE 702 detects all assistance information transmitted by base stations in the common search space and/or group-common search space. In step 722, UE 702 determines the interference signals with significant transmission power in the received signals based on the detected assistance information. UE 702 also cancels or suppresses the interference signals with significant transmission power from the received signals based on the detected assistance information. In step 731, UE 702 receives DCI scheduling information unicasted from gNB 701. In step 741, UE 702 detects the unicasted DCI over UE-specific search space. In step 751, gNB 701 and UE 702 are able to perform data channel transmission and reception based on the DCI.

The assistance information beneficial for interference cancellation or suppression includes at least one of the following: 1) Frequency domain resource allocation (e.g. RBs in LTE or NR) of PDSCH/PUSCH; 2) Time domain resource allocation (e.g. OFDM symbols in LTE or NR) of PDSCH/PUSCH; 3) Modulation order (e.g. pi/2 BPSK, QPSK, 16QAM, 64QAM, 256QAM) of PDSCH/PUSCH; 4) Antenna port (e.g. DMRS configuration) of PDSCH/PUSCH—exact antenna ports applied in the indicated time/frequency radio resources or candidate antenna ports applied in the indicated time/frequency radio resources; 5) RB (resource block) bundling size of PDSCH/PUSCH—The number of RBs over which a UE can assume that the same MIMO precoder or beamforming is applied; 6) Number of spatial layers over the same radio resources of PDSCH/PUSCH—If exact antenna port configuration is provided in the broadcast DCI, then the number of spatial layers over the same radio resources is not necessary, if only candidate antenna port configuration is provided in the broadcast DCI, then the number of spatial layers over the same radio resources is beneficial for a UE to detect exact antenna ports.

Figure 8:
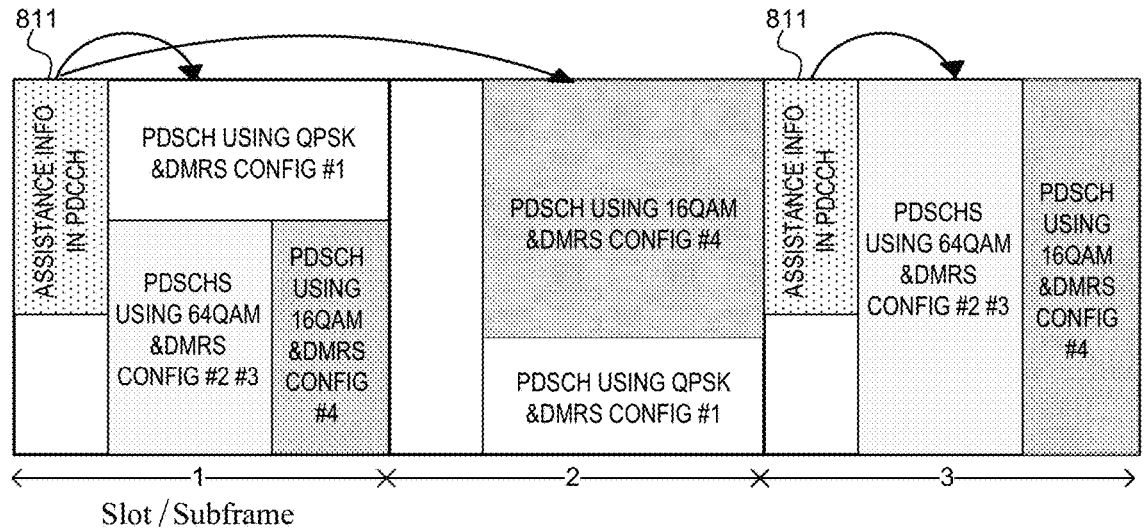
FIG. 8 illustrates one embodiment of broadcasting assistance information for interference cancellation or suppression in wireless mobile broadband cellular systems in accordance with one novel aspect.

FIG. 8 illustrates one embodiment of broadcasting assistance information for interference cancellation or suppression in wireless mobile broadband cellular systems in accordance with one novel aspect. If base station needs to broadcast the assistance information for interference cancellation or suppression related to all UEs scheduled in a slot, the signaling overhead can be high. One way to reduce the signaling overhead is that the base station can just broadcast the assistance information for interference cancellation or suppression related to some selected UEs scheduled in a slot, e.g. cell-edge UEs (or UEs with low CQI index), MU-paired UEs (UEs are paired for MU-MIMO) or data packets with high priority (e.g. URLLC data packets). One example is illustrated in FIG. 8. The assistance information 811 broadcast is carried in PDCCH, which is transmitted over either a common search space or a group common search space. In FIG. 8, the assistance information 811 broadcast provides a map related to the modulation order and the applied DMRS configuration(s) for PDSCH(s) in one or multiple slots (or subframes), e.g., COFIG#1 for a first set of UEs, CONFIG#2#3 for a second set of UEs, and CONFIG#4 for a third set of UEs. When a UE receives the assistance information broadcast, the UE can perform the interference cancellation or suppression based on the provided map.

Figure 9:
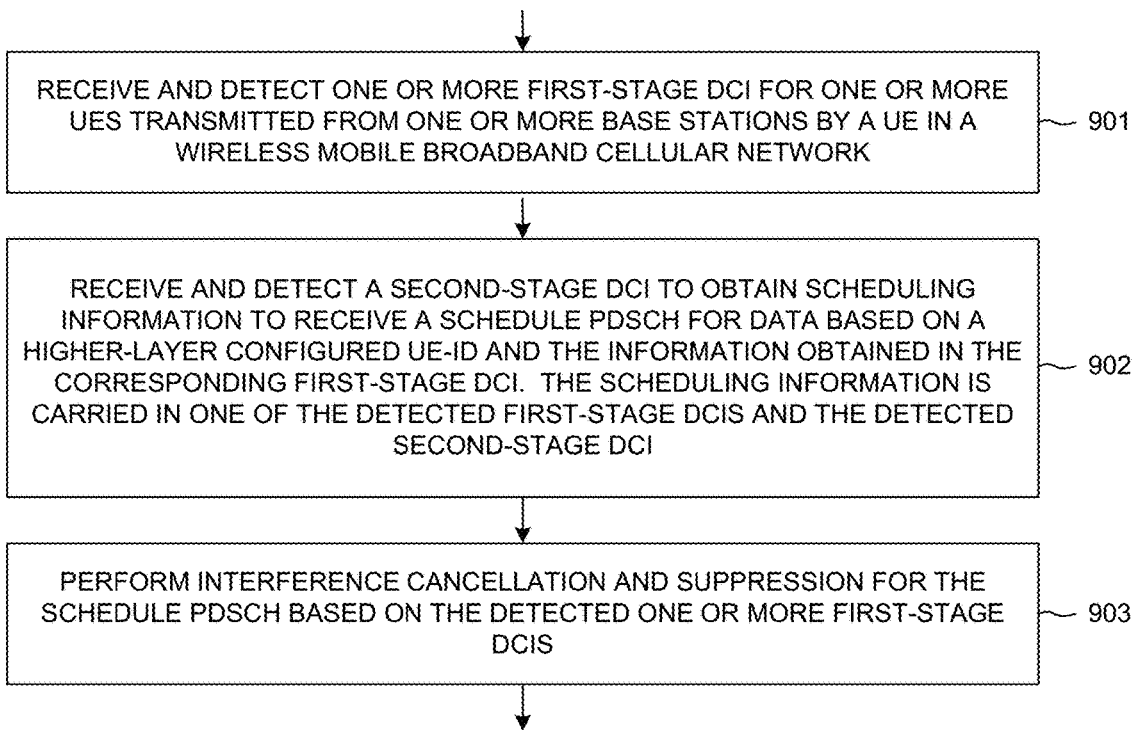
FIG. 9 is a flow chart of a method of two-stage DCI for interference cancellation or suppression in accordance with one novel aspect.

FIG. 9 is a flow chart of a method of two-stage DCI for interference cancellation or suppression in accordance with one novel aspect. In step 901, a UE receives and detects one or more first-stage downlink control information (DCIs) for one or more UEs transmitted from one or more base stations in a wireless mobile broadband cellular network. In step 902, the UE receives and detects a second-stage DCI to obtain scheduling information to receive a scheduled physical downlink shared channel (PDSCH) for data based on a higher-layer configured UE ID and the information obtained in the corresponding first-stage DCI. The scheduling information is carried in one of the detected first-stage DCIs and the detected second-stage DCI. In step 903, the UE performs interference cancellation or suppression for the scheduled PDSCH based on the detected one or more first-stage DCIs.

Figure 10:
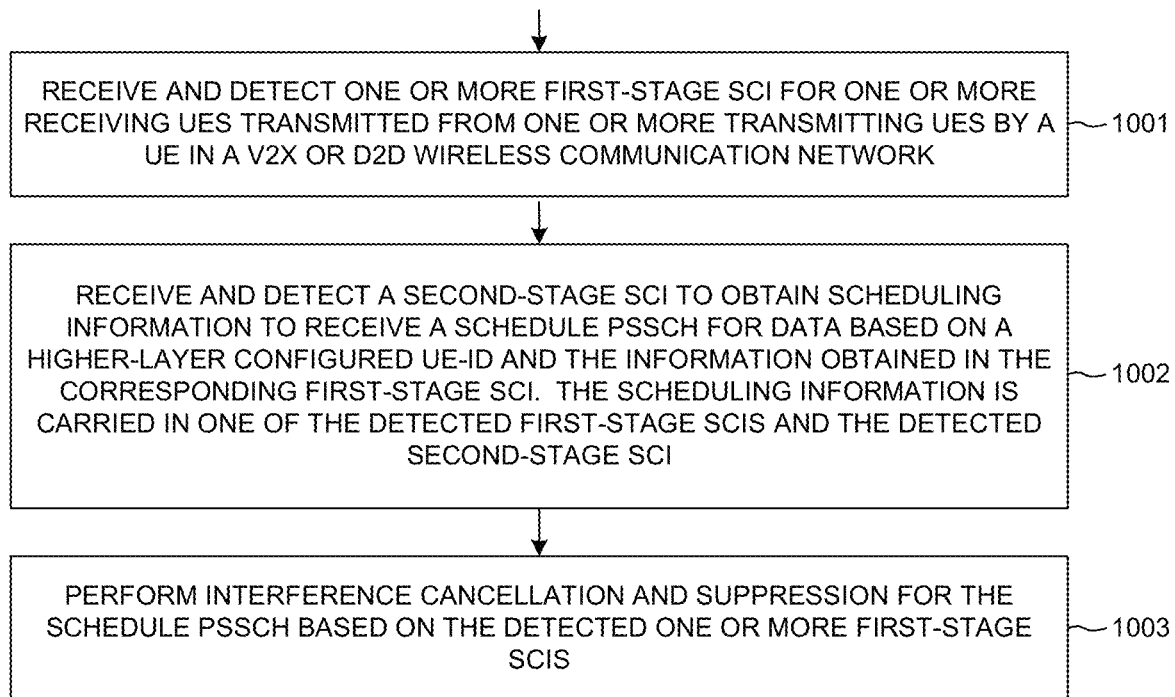
FIG. 10 is a flow chart of a method of two-stage SCI for interference cancellation or suppression in accordance with one novel aspect.

FIG. 10 is a flow chart of a method of two-stage SCI for interference cancellation or suppression in accordance with one novel aspect. In step 1001, a UE receives and detects one or more first-stage sidelink control information (SCIs) for one or more receiving UEs transmitted from one or more transmitting UEs in a vehicle-to-everything or device-to-device wireless communication network. In step 1002, the UE receives and detects a second-stage SCI to obtain scheduling information to receive a scheduled physical sidelink shared channel (PSSCH) for data based on a higher-layer configured UE ID and the information obtained in the corresponding first-stage SCI. The scheduling information is carried in one of the detected first-stage SCIs and the detected second-stage SCI. In step 1003, the UE performs interference cancellation or suppression for the scheduled PSSCH based on the detected one or more first-stage SCIs.

Figure 11:
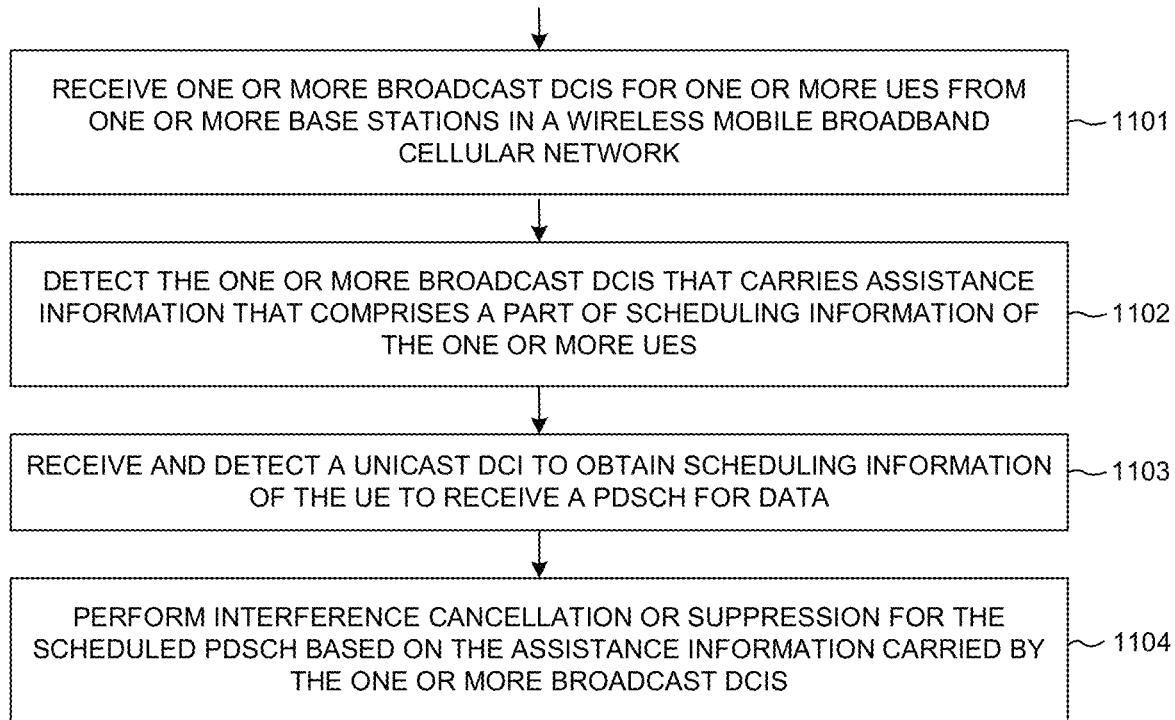
FIG. 11 is a flow chart of a method of broadcasting assistance information for interference cancellation or suppression in accordance with one novel aspect.

FIG. 11 is a flow chart of a method of broadcasting assistance information for interference cancellation or suppression in accordance with one novel aspect. In step 1101, a UE receives one or more broadcast downlink control information (DCIs) for one or more UEs from one or more base stations in a wireless mobile broadband cellular network. In step 1102, the UE detects the one or more broadcast DCIs. The one or more broadcast DCIs carries assistance information that comprises a part of scheduling information of the one or more UEs. In step 1103, the UE receives and detects a unicast DCI to obtain scheduling information of the UE to receive a scheduled physical downlink shared channel (PDSCH) for data. In step 1104, the UE performs interference cancellation or suppression for the scheduled PDSCH based on the assistance information carried by the one or more broadcast DCIs.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving and detecting one or more first-stage downlink control information (DCIs) for one or more user equipments (UEs) transmitted from one or more base stations by a user equipment (UE) in a wireless mobile broadband cellular network;
   receiving and detecting a second-stage DCI to obtain scheduling information to receive a scheduled physical downlink shared channel (PDSCH) for data based on a higher-layer configured UE ID and the information obtained in the corresponding first-stage DCI, wherein the scheduling information is carried in one of the detected first-stage DCIs and the detected second-stage DCI; and
   performing interference cancellation or suppression for the scheduled PDSCH based on the detected one or more first-stage DCIs.

2. The method of claim 1, wherein the first-stage DCI comprises at least one of resource allocation information for the scheduled data, a modulation order, a number of antenna ports, a resource block bundling size, and a number of spatial layers.

3. The method of claim 1, wherein the UE monitors the first-stage DCI via a broadcasted/groupcasted signaling over a predefined or preconfigured search space.

4. The method of claim 1, wherein the UE monitors the second-stage DCI via a unicasted/groupcasted signaling over a UE-specific or group-specific search space.

5. The method of claim 1, wherein the UE receives a radio resource control (RRC) signaling to configure a group-common search space for the first-stage DCI and a group-specific search space for the second-stage DCI.

6. The method of claim 1, wherein the first-stage DCI and the second-stage DCI are both located inside a Physical Downlink Control Channel (PDCCH) region.

7. The method of claim 1, wherein the first-stage DCI is located inside a Physical Downlink Control Channel (PDCCH) region, and wherein the second-stage DCI is located inside a PDSCH region.

8. A method comprising:
   receiving and detecting one or more first-stage sidelink control information (SCIs) for one or more receiving user equipments (UEs) transmitted from one or more transmitting UEs by a user equipment (UE) in a vehicle-to-everything or device-to-device wireless communication network;
   receiving and detecting a second-stage SCI to obtain scheduling information to receive a scheduled physical sidelink shared channel (PSSCH) for data based on a higher-layer configured UE ID and the information obtained in the corresponding first-stage SCI, wherein the scheduling information is carried in one of the detected first-stage SCIs and the detected second-stage SCI; and performing interference cancellation or suppression for the scheduled PSSCH based on the detected one or more first-stage SCIs.

9. The method of claim 8, wherein the first-stage DCI comprises at least one of resource allocation information for the scheduled data, a modulation order, a number of antenna ports, a resource block bundling size, and a number of spatial layers.

10. The method of claim 8, wherein the UE monitors the first-stage SCI via a broadcasted/groupcasted signaling over a predefined or preconfigured search space.

11. The method of claim 8, wherein the UE monitors the second-stage SCI via a unicasted/groupcasted signaling over a UE-specific or group-specific search space.

12. The method of claim 8, wherein the UE is preconfigured with demodulation reference signal (DMRS) scrambling sequence seed to avoid collision.

13. The method of claim 8, wherein the first-stage SCI and the second-stage SCI are both located inside a Physical Sidelink Control Channel (PSCCH) region.

14. The method of claim 8, wherein the first-stage SCI is located inside a Physical Sidelink Control Channel (PSCCH) region, and wherein the second-stage SCI is located inside a Physical Sidelink Shared Channel (PSSCH) region.

15. A method comprising:
receiving one or more broadcast downlink control information (DCIs) for one or more user equipments (UEs) from one or more base stations by a UE in a wireless mobile broadband cellular network;

detecting the one or more broadcast DCIs by the UE, wherein the one or more broadcast DCIs carries assistance information that comprises a part of scheduling information of the one or more UEs;

receiving and detecting a unicast DCI to obtain scheduling information of the UE to receive a scheduled physical downlink shared channel (PDSCH) for data; and performing interference cancellation or suppression for the scheduled PDSCH based on the assistance information carried by the one or more broadcast DCIs.

16. The method of claim 15, wherein the assistance information comprises at least one of resource allocation information for the scheduled data, a modulation order, a number of antenna ports, a resource block bundling size, and a number of spatial layers.

17. The method of claim 15, wherein the assistance information is related to a subset of selected UEs and is broadcasted in corresponding slots scheduled for the subset of selected UEs.

18. The method of claim 15, wherein the UE monitors the broadcast DCI via a broadcasted signaling over a common or group-common search space in a control region configured by the network.

19. The method of claim 15, wherein the UE monitors the broadcast DCI via a broadcasted signaling over a data region scheduled by another DCI.

20. The method of claim 15, wherein the UE monitors the broadcast DCI via a broadcasted signaling over a specific set of radio resources in a data region that is predefined or preconfigured by the network.

* * * * *